Aug. 23, 1960 T. G. CUSTIN 2,950,451

WAVE TRANSMISSION FILTER

Filed March 4, 1954 3 Sheets-Sheet 1

INVENTOR:
THOMAS G. CUSTIN,
BY Charles W. Hutchins
HIS ATTORNEY.

Aug. 23, 1960 T. G. CUSTIN 2,950,451

WAVE TRANSMISSION FILTER

Filed March 4, 1954 3 Sheets-Sheet 2

INVENTOR:
THOMAS G. CUSTIN,

BY Charles M. Hutchins

HIS ATTORNEY.

INVENTOR:
THOMAS G. CUSTIN,
BY Charles M. Hutchins
HIS ATTORNEY.

United States Patent Office 2,950,451

Patented Aug. 23, 1960

2,950,451

WAVE TRANSMISSION FILTER

Thomas Grant Custin, Baldwinsville, N.Y., assignor to General Electric Company, a corporation of New York Filed Mar. 4, 1954, Ser. No. 414,067

9 Claims. (Cl. 333—73)

The present invention relates to wave transmission systems and has an object thereof to provide an improved wave transmission filter.

The wave transmission filter herein disclosed is particularly adapted for use in high frequency circuits which require steeper frequency attenuation characteristics or broader and deeper passbands than may be achieved with prior circuit arrangements. One application of the invention is in the transmission of television signals at very high frequencies, for example 470 to 890 megacycles.

The present transmission standards for television transmissions at these frequencies require that the visual carrier be amplitude modulated, with only a vestigial portion of the lower visual sideband being transmitted, and that the aural signal be transmitted on a frequency modulated carrier 4.5 megacycles above the visual carrier. Since the normal bandwidth of frequencies passed by the visual transmitter extends well beyond the 4.5 megacycle region, it is necessary to attenuate the upper portion of the upper visual sideband from 4 megacycles above the visual carrier, where the attenuation should be no greater than 0.5 decibel, to 4.5 megacycles above the visual carrier, where the attenuation should be greater than 30 decibels to avoid interference with the aural transmissions. Equally stringent requirements are made on the attenuation of the lower visual sideband. At the visual carrier frequency, the attenuation should be less than 0.5 decibel. At 0.75 megacycle below the visual carrier, the attenuation should be approximately 3.0 decibels, while in the range of from 1.25 to 4 megacycles below the visual carrier the attenuation should be greater than 20 decibels.

These transmission standards have been met in filter systems acting directly upon the modulated visual signal at lower carrier frequencies but filters for higher carrier frequencies have not been as effective. At higher frequencies, retention of the same absolute signal standards represents a reduction in the percentage frequency differences involved, and requires that correspondingly higher "Q" components be employed in the filter. At the very high frequencies now under consideration, the "Q's" required by components in conventional circuits are far in excess of values attainable. The term "Q" here and subsequently employed is a term used to designate the ratio of the reactance to the resistance of a circuit component.

Accordingly it is an object of the present invention to provide a novel filter circuit exhibiting improved selectivity characteristics while employing components of ordinary "Q's."

It is a further object of the present invention to provide an improved filter for use at high frequencies in which extremely steep attenuation characteristics may be obtained.

It is still another object of the present invention to provide an improved filter for use at high frequencies having a relatively wide passband with steep attenuation characteristics at the edges thereof.

It is yet another object of the present invention to provide an improved filter for use in television signals at high frequencies in which both substantially complete attenuation of the lower sideband of the visual signal may be obtained as well as steep attenuation at the high frequency limits of the visual signal.

It is a further object of the present invention to provide a filter unit which may be employed in a television transmission system for attenuation of the undesired portions of a visually modulated double sideband signal while at the same time providing effective isolation between the visual transmitter and aural transmitter and facilitating efficient coupling of those transmitters to a single antenna.

These and other objects are achieved by a novel wave transmission filter comprising a first tuned circuit tuned to a first frequency, a second tuned circuit tuned to a second frequency slightly removed from said first frequency, and a hybrid network having two pairs of conjugately related terminals, the terminals of a first pair of said conjugately related terminals being coupled respectively to said first and said second tuned circuits. A second pair of tuned circuits may also be coupled to the first pair of conjugately related terminals of the hybrid, each being tuned to frequencies only slightly removed from one another. The remaining terminals of the hybrid network may serve for external connection to the filter. As will be seen from the detailed discussion below, the objects and advantages of the invention are realized by coupling the tuned circuits in the filter with coupling strengths determined in accordance with the principles of the invention.

The novel features which are believed to be characteristic of the invention are set forth with particularity in the appended claims. The invention itself, however, both as to its organization and method of operation, together with further objects and advantages thereof, may best be understood by reference to the following description taken in connection with the following drawings in which:

Figure 1 illustrates a wave transmission filter embodying the present invention.

Figures 2(*a*) and 2(*b*) are explanatory graphs of the voltage attenuation versus frequency for the embodiment shown in Figure 1.

Figure 1:
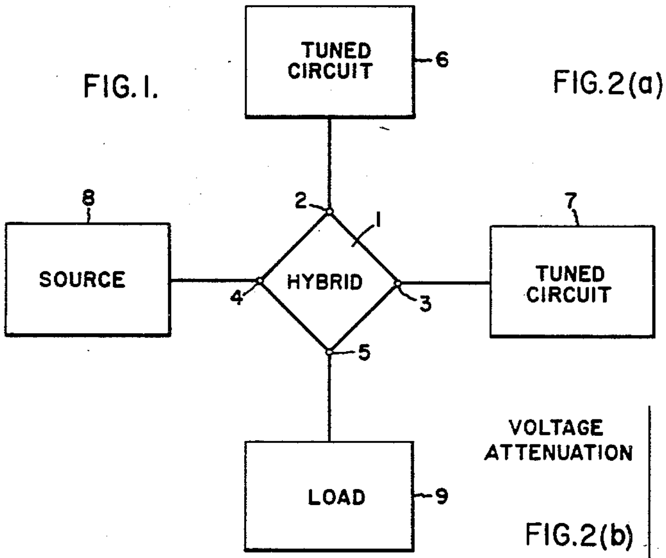

Referring now to Figure 1, there is shown a first embodiment useful in the invention comprising a hybrid network 1, having two pairs of conjugately related terminals; terminal 2 being conjugately related to terminal 3, and terminal 4 being conjugately related to terminal 5 respectively. The term "conjugately related terminals" is here used to designate those pairs of terminals whose electrical properties are such that one terminal of such pair may be made to appear electrically isolated from another terminal of such pair. Terminals 2 and 3 are connected respectively to tuned circuit 6 and tuned circuit 7. Terminals 4 and 5 are coupled respectively to a source 8 of high frequency potentials and a load 9.

The hybrid network employed may take a number of forms. An advantageous form for high frequency use is one comprising four equal length branches formed of concentric lines joined end to end to form a closed loop and having the terminals of the network coupled to the junctions. A first pair of opposing branches is constructed to have an admittance equal to the square root of two times the admittances of the second pair of opposing branches. The lengths of each of the branches is an odd quarter of a wave length, preferably three quarter wave lengths. The later pair of branches of lower admittance then connect each conjugately related pair of terminals. In Figure 1, terminals 4 and 2, and terminals 5 and 3, are coupled by branches of higher admittance.

The tuned circuits may also take a number of forms, and for high frequency use, a cavity of concentric line resonator exhibiting either series or parallel resonance at the critical frequencies may be employed.

Preliminary to considering the electrical properties of the overall circuit shown in Figure 1, the significant properties of a hybrid such as is shown in Figure 1 should be noted. If points 2 and 3 are each connected to equal valued, non-reflective impedances, the terminals 4 and 5 will be effectively isolated so that a generator connected to terminal 4 will deliver no energy to terminal 5. This isolation arises by virtue of the fact that waves traveling along the short path between terminals 4 and 5 are of equal magnitude but 180° out of phase with voltages traveling along the long path between terminals 4 and 5 and thus cancel. By virtue of this property, points 4 and 5 are said to be conjugately related. Since the hybrid is symmetrical, points 2 and 3 are likewise "conjugately" related.

Consider now the case where equal valued reflective impedances are connected to terminals 2 and 3 in place of the non-reflective impedances. It may be shown that these generalized impedances may each be replaced by a matched or non-reflective impedance in series with a generator whose output end phase is controlled by the nature of the actual terminating impedance. The total output appearing at the load may be obtained by application of the principle of superposition i.e., the summation of the individual contributions of each source to the load. Assuming now that such a substitution is made, it will be seen that by virtue of the hypothetical matched loads at terminals 2 and 3 no energy will be supplied directly to the load 9 by the source 8. The conjugate relation between the terminals 4 and 5 to which the load 9 and source 8 are connected provide this isolation.

Assuming that the hypothetical generators connected at terminals 2 and 3, supply waves of equal amplitude and frequency, but differing in phase by 90°, it can be shown that at one of the other pair of conjugately related terminals, substantially the total output will appear, while substantially no output will appear at the other terminal. Referring again to Figure 1 and assuming the hypothetical generator having the lagging phase angle to be coupled to terminal 3 and the other hypothetical generator to be coupled to terminal 2, it will be seen that at terminal 4 the signal supplied from one path will be retarded 90° while that at terminal 4 supplied from 3 will be retarded 270°. Since the waves supplied by the two hypothetical generators are 180° out of phase at terminal 4, they will cancel at this terminal and this terminal will be isolated. Applying the same analysis to determine the conditions at terminal 5, it is seen that at 5, the total output will appear.

If the phase relations and intensities of the signals fed by the hypothetical generators to terminals 2 and 3 change, the energy supplied to terminal 5 will decrease, while the energy supplied to terminal 4 will increase. When the system functions ideally, the gain in energy to one terminal is equal to the loss in energy at the other terminal. It can thus be seen that the energy supplied between a source and a load coupled to one pair of conjugately related terminals of a hybrid network is a function of the values of the impedances coupled to the other pair of conjugately related terminals of the hybrid, and more particularly the reflective coefficients of these impedances.

Hybrid networks have been previously analyzed. A mathematical analysis has been made of the case in which completely generalized impedances are coupled to one pair of conjugate terminals while a source and a load having matched impedances are coupled to the other pair of conjugate terminals. The mode of solution proceeds along the lines suggested above, and reaches the conclusion that the attenuation of the voltage is:

$$\frac{Kb-Ka}{2} \qquad (1)$$

Where $Ka$ may be taken to be the reflection coefficient of tuned circuit 6 in Figure 1, and $Kb$ may be taken to be the reflection coefficient of tuned circuit 7 in Figure 1.

The reflection coefficients are respectively;

$$Ka=\frac{Yo/Ya-1}{Yo/Ya+1}$$

$$Kb=\frac{Yo/Yb-1}{Yo/Yb+1}$$

where $Yo$ is the admittance of the branches connecting conjugately related pairs of terminals 2 and 3, and 4 and 5:

$Ya$ is the admittance of tuned circuit 6.

$Yb$ is the admittance of tuned circuit 7.

Equation 1 indicates that the attenuation of the voltages at 5 may be treated as a function of the reflection coefficients alone. If the coefficients are identical, power will pass through the hybrid with negligible loss. If the reflection coefficients are not alike, the difference will increase the impedance or attenuation between the source and load. The reflection coefficients may be readily computed from the admittances of the branches of the networks and the admittances of the coupled tuned circuits.

If now one replaces the generalized diverse impedances by a pair of tuned circuits tuned to different frequencies, in accordance with the invention, and one admits signals to the hybrid whose frequencies may be varied through the range to which the circuits are tuned, certain unique filter characteristics appear.

Preliminarily, the condition should be considered in which similar tuned circuits are tuned to the same frequency. Under these conditions, as the applied frequency rises to the resonant frequency, the phase shift of the reflection coefficient of each tuned circuit changes gradually until near resonance, and then near resonance changes rapidly to one of zero phase shift. Beyond resonance, the phase shift continues to change in the same direction rapidly at first, and then gradually. At one side of resonance, the phase corresponds to the phase shift produced by capacitive load. At the other side of resonance, the phase corresponds to the phase shift produced by an inductive load. Since both tuned circuits are tuned to the same frequency, reflection coefficients $Ka$ and $Kb$ are of the same magnitude and phase angle. The effect of the change in frequency on the output voltage or attenuation of the filter is arrived at by purely algebraic addition of the magnitude of each reflection coefficient throughout the frequency range.

Accordingly, the filter passes all frequencies without appreciable attenuation when the tuned circuits are tuned to the same frequency.

When the tuning of the two tuned circuits is changed so that one circuit is tuned to a frequency slightly removed from that of the other, a marked change in operation occurs. Throughout the region well below resonance of both circuits, both reflection coefficients have a phase angle of the same value. Here the difference between the reflection coefficients is a purely algebraic function. In the region well above the resonance frequencies of both circuits, the difference between the reflection coefficients is also a purely algebraic function for the same reasons. When the applied frequency is increased to a value more closely equal to the lower resonance frequency, algebraic subtraction is no longer accurate, because in this region the phase shift of the reflection coefficient of the lower frequency tuned circuit commences to increase with greater rapidity than the phase shift of the reflection coefficient of the higher frequency tuned circuit. Consequently, the phase angle difference between them increases. Since attenuation is a function of the difference between the two vectors representing the reflection coefficients, the rate of change of difference in vector length with the difference angle is greatest when the angles are small and least when the angles are nearly 180° apart. This is most nearly true when the lengths of the vectors are of the same magnitude, as would be the case until the applied frequency is very close to the lower resonance frequency. When the lower resonance point is reached, the difference in phase angle is somewhat less than 90° and the increased rate of change of magnitude of Equation 1 with frequency arising from the angular displacement of the two vectors is reduced. Immediately above the higher resonance frequency, however, the difference angle between the coefficients again decreases to a point permitting an increase in the rate of change of expression 1 with frequency. The term abrupt may be used to denote very rapid or sharp or steep change (rate of change).

Expression 1 thus indicates that to take advantage of the simultaneous change in phase angle and magnitude of the reflection coefficients to increase the change in attenuation rates in the portion of the spectrum just above and below the frequencies of the tuned circuits, the difference frequencies of the tuned circuits should be carefully selected so that the phase angle differences between both coefficients will be relatively small in a region where the absolute value of the coefficients are of the same order of magnitude. When high "Q" components or loose coupling or both are employed, the difference frequencies should be correspondingly smaller. Proper selection of the difference frequencies provides a substantial increase in the attenuation rates, particularly in the portion of the frequency spectrum just outside the two resonance frequencies.

The actual operation of the first embodiment of the invention, illustrated in Figure 1, may now be considered. The source 8 is energized to supply high frequency potentials to hybrid network terminal 4 giving rise to high frequency currents in the hybrid network 1, which are applied to the load 9. The tuned circuits at 6 and 7 are high "Q" tuned circuits which present frequency dependent impedances to the other terminals of the hybrid network 1, thereby controlling the energy passing through the hybrid network in the general manner discussed above.

Figure 2A:
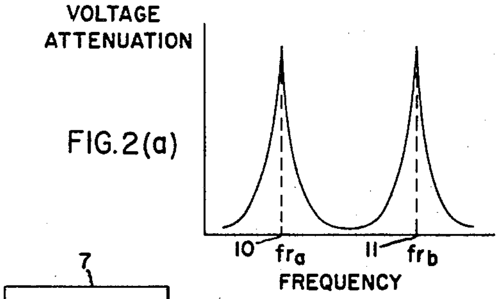
Figure 2B:
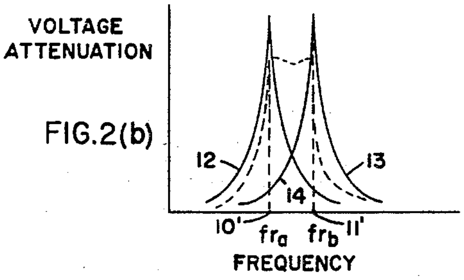

In accordance with an aspect of the invention, the tuned circuits are tuned to slightly different frequencies. Preferably, the tuning is adjusted so that the attenuation of the tuned circuits are of substantial values for all frequencies between the respective resonant frequencies. Figure 2$a$ illustrates the voltage attenuation arising from the impedance appearing between terminals 4 and 5 plotted against applied frequency under a condition in which the resonant frequencies of the tuned circuits are widely separated. The graph has two pronounced peaks; one at 10 corresponding to the resonance point of the tuned circuit 6 and another at 11 corresponding to the resonance point of the tuned circuit 7. Approximately midway between the resonance points, the attenuation attains a value near zero. The curve is approximately a plot of the individual change in attenuation arising from each resonant element alone. When the resonant frequencies are moved more closely toward one another, the "skirts" of the two curves eventually attain a substantial value at the same frequency coordinates. Figure 2$b$ illustrates the attenuation when the adjustment of the resonant frequencies is such as to achieve a steeper attenuation characteristic, line 12 forming the plot of the effect of tuned circuit 7 alone on the attenuation. Dotted line 14, the plot of the total attenuation, is seen to rise more sharply than either curve 12 or 13 in the portion of the region of overlap, outside the resonant frequencies, shown respectively at 10' and 11'. In the portion of the region between the resonant frequencies the plot dips slightly below the maximum values.

The steeper attenuation characteristic arises by virtue of the changes in phase of the reflection coefficients about resonance, as the reflecting impedances change both in magnitude and phase, bringing about an augmented rate of change with frequency in the sum of the reflection coefficients. By variation of the frequency differences with the region suggested, one may obtain a relatively large selection of improved frequency characteristics. Practical experimentation has shown that the attenuation rates achieved could ordinarily be effected only by tuned circuits having a "Q" of several hundred thousand.

The circuit of Figure 1 is of general application when steep attenuation slopes are required on both sides of a band of frequencies and when moderate absolute attenuations are required throughout the attenuation band. Due to the presence of resistive components in the tuned circuits the magnitude of the attenuations at resonance is not infinite. When it is desired to provide a characteristic having a steep attenuation on only one side of a band of frequencies and to obtain much greater absolute attenuations through the attenuation band, the arrangement of Figure 3 may be employed.

Figures 3, 4:
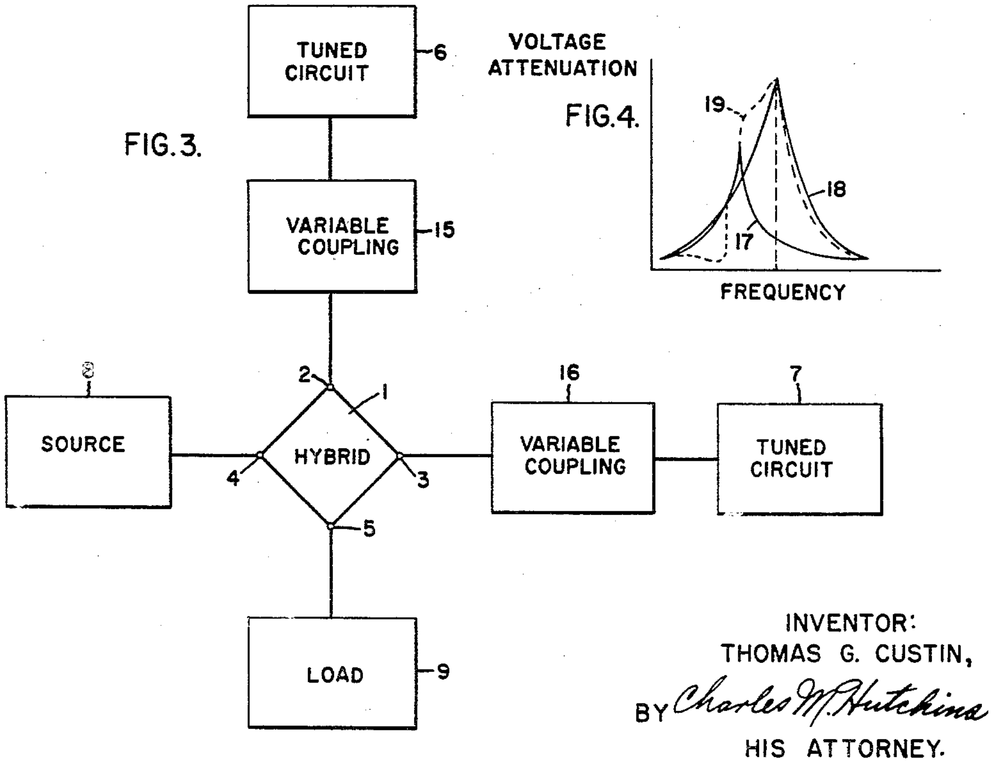
Figure 3 illustrates a second embodiment of the present invention especially adapted for eliminating interference between visual and aural transmitters in television transmission.
Figure 4 is an explanatory graph of the voltage attenuation versus frequency for the embodiment shown in Figure 3.

The arrangement of Figure 3 is similar to that of Figure 1, and those components which are repeated in Figure 3 bear similar reference numerals and may have similar electrical characteristics. The arrangement of Figure 3 contains all the components shown in Figure 1, and in addition a first variable coupling 15 which is connected between the hybrid terminal 2 and the tuned circuit 6, and a second variable coupling 16, which is coupled between the hybrid terminal 3 and the tuned circuit 7.

The improvement in the steepness of the attenuation slope in the arrangement of Figure 3 arises when the variable coupling of one tuned circuit is reduced. Reducing the coupling has the effect of steepening the slope of the attenuation curve at the cost of reducing the depth of the maximum attenuation of the lightly coupled tuned circuit at its tuned frequency. If the steep attenuation slope is desired on the low frequency side of the rejection band, the coupling to the tuned circuit tuned to the lower frequency, preferably tuned circuit 6, is reduced considerably below critical coupling while the coupling of the other tuned circuit is retained at a value more nearly equal to critical coupling. When reduced coupling is employed, the lower frequency slope is steepened, thereby permitting the other tuned circuit to be more tightly coupled. The composite characteristic is thus one having both a steep slope and a high absolute attenuation.

Figure 4 illustrates the operation of the arrangement of Figure 3, when the elements 15 and 16 are adjusted to utilize this principle. Line 17 is the plot of the attenuation of the tuned circuit 6 against frequency, while line 18 is the corresponding plot of the tuned circuit 7. Dotted line 19 represents the composite characteristics obtained. It should be observed that the steepness of the attenuation curve is controlled by the loosely coupled tuned circuit, while the magnitude of the attenuation through the rejection band is controlled by the more tightly coupled tuned circuit. In an actual television installation the improvement in attenuation at the rejection band is approximately 10 decibels while retaining, the attenuation rate at a value complying with present transmission standards.

Figures 5, 6:
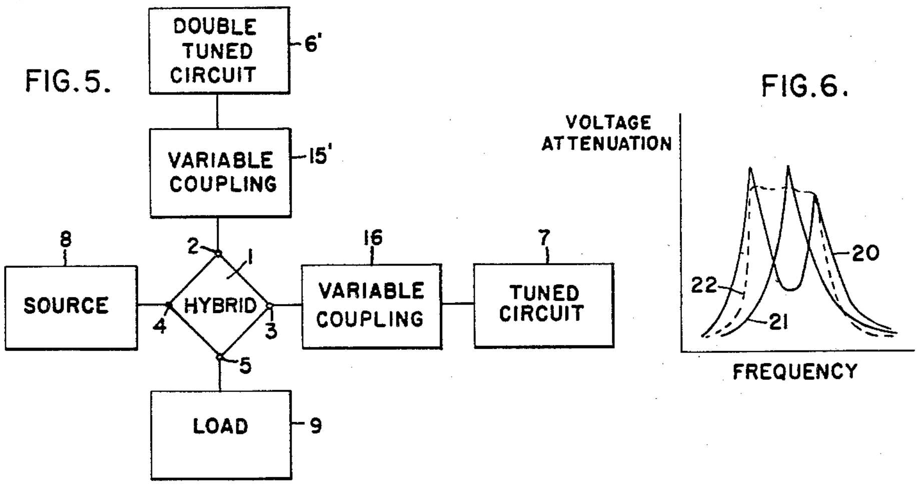
Figure 5 illustrates a third embodiment of the present invention especially adapted for attenuation of the lower sideband of a visually modulated double sideband signal.
Figure 6 is an explanatory graph of the voltage attenuation versus frequency for the embodiment shown in Figure 5.

When it is desired to provide a wider rejection band, while at the same time providing a moderate attenuation through the rejection band and a steep attenuation slope on at least one side of the band, a somewhat different technique may be employed. Figure 5 shows an arrangement which is adapted to attenuate the lower sideband of the visual carrier of a television signal for a bandwidth of slightly less than 3 megacycles, at an average attenuation of approximately 20 decibels.

The arrangement of Figure 5 is similar to that illustrated in Figure 3 and contains components similar to those illustrated in that figure, with the exception of the tuned circuit 6 and variable coupling 15. In Figure 5, tuned circuit 6 is now replaced by a double tuned circuit 6′. The variable coupling 15′ which replaces variable coupling 15 has the property of varying the coupling to at least one of the tuned circuits contained in double tuned circuits 6′ independently of the coupling to the other tuned circuit. The coupling may conveniently be made by providing tuned direct coupling between the hybrid network and the first tuned circuit 6′ and then providing variable coupling means between the first and second tuned circuits forming the double tuned circuit 6′. The connections in the two figures are the same.

The adjustment of the arrangement of Figure 5 employs the same principle used in the other embodiments for steepening the attenuation slopes of the filter. In practice, the double tuned circuit 6′ is tuned to have its resonant frequencies near the boundary frequencies of the rejection band, while the single tuned circuit 7 is tuned to the mid-region between the resonant peaks. In order to accentuate the attenuation slope in the higher frequency side, the coupling of the higher frequency portion of double tuned circuit 6′ may be reduced. The plot of attenuation versus frequency of the double tuned circuit is shown at 20. The corresponding plot of tuned circuit 7 is shown at 21. The resultant curve is shown as dotted line 22.

Figure 2(*a*) generally evidences the fact that single tuned circuits of remote resonant frequencies may be connected at conjugate points of a hybrid, where they may add their respective contribution to the impedance between the other pair of conjugate terminals without adverse interaction. One may further combine the tuned circuits illustrated in Figures 3 and 5 about a single hybrid to perform both of the specialized functions indicated above. This arrangement is somewhat simpler than using separate hybrids and produces substantially as effective filtering. In this manner, a composite filter may be constructed exhibiting both the property of attenuating the lower side band of a visual signal while at the same time attenuating the upper portion of the visual signal in order to prevent radiation at frequencies reserved for the aural transmitter. The embodiment shown in Figures 7 and 8 performs both functions.

Figure 7:
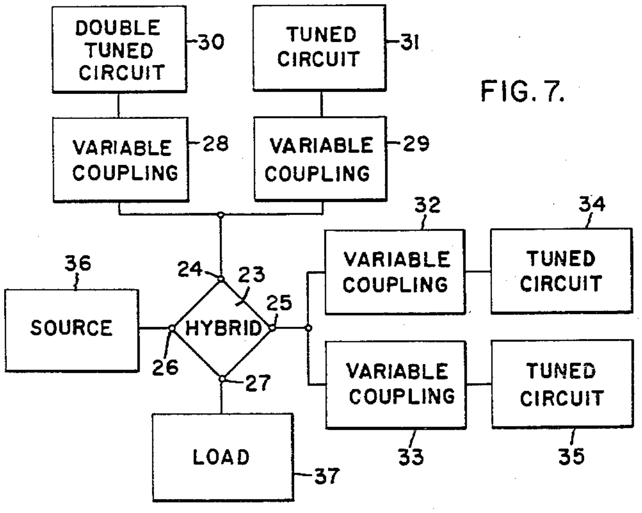
Figure 7 illustrates a further embodiment of the present invention in a television transmission system especially adapted for the combined purpose of attenuating the lower sideband of the visual signal, and eliminating interference between the visual and aural transmitters.

A hybrid 23 is shown in Figure 7 having conjugately related pairs of terminals 24 and 25, and 26 and 27 respectively. Terminal 24 is coupled through variable coupling devices 28 and 29 to double tuned circuit 30, and single tuned circuit 31, respectively. Terminal 25 is coupled through variable coupling devices 32 and 33 to tuned circuits 34 and 35 respectively. Terminals 26 and 27 of the hybrid 23 are coupled respectively to the source 36, of visually modulated visual signals and the load 37.

Figure 8:
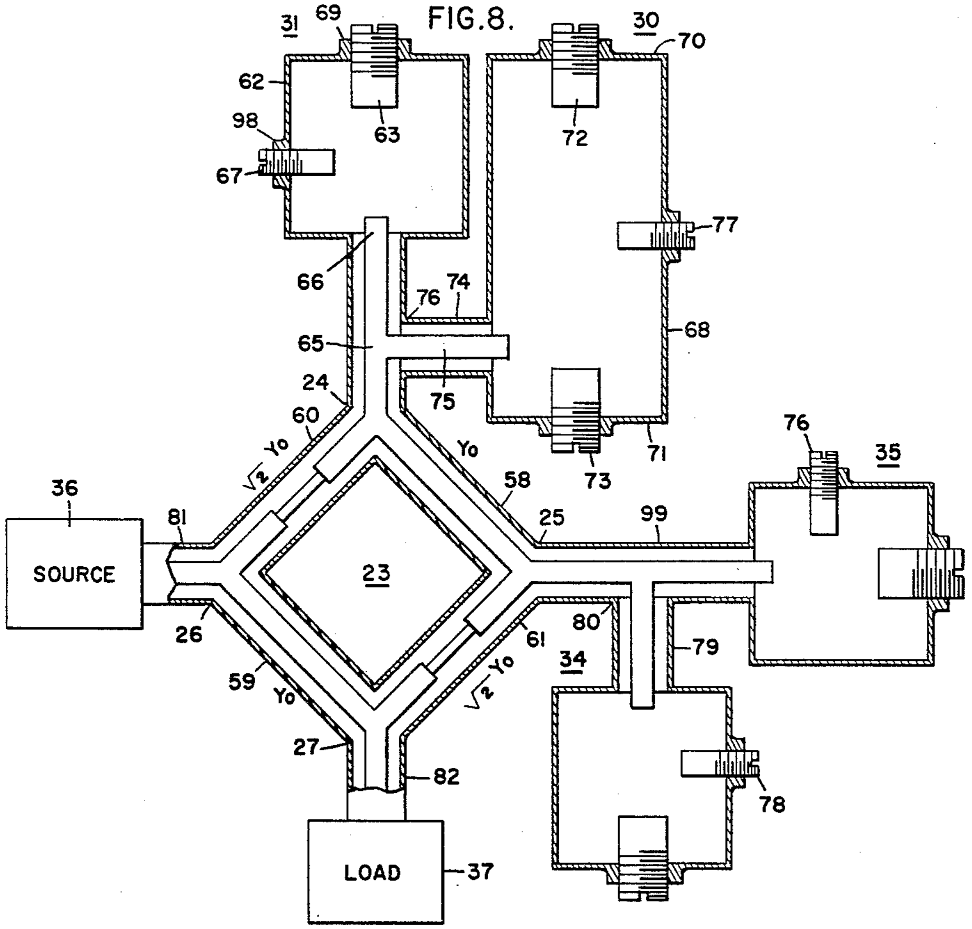
Figure 8 is a simplified structural drawing of the embodiment illustrated schematically in Figure 7.

Referring now to Figure 8, a structural embodiment of the arrangement of Figure 7 is shown. Reference numerals to elements occurring in Figure 7 have been applied where possible to corresponding elements in Figure 8.

A hybrid network is shown at 23, composed of concentric line branches, 58 and 59 and 60 and 61. Each branch has a length equal to three quarters of the wave length of the mean applied frequency. Branches 58 and 59 have a characteristic admittance of $Yo$ and interconnect the conjugately related network terminals 24 and 25, and 26 and 27 respectively. Branches 60 and 61 present an admittance of a square root of two times $Yo$, being formed of three quarter wave transformers. This design permits the central conductors to be of equal diameter at the junctions thereby reducing the discontinuity at the junction while still permitting unequal admittances between the branches.

Tuned circuits 30 and 31 are coupled to junction 24. Tuned circuit 31 is shown as a hollow cylindrical tank 62 adapted to resonate at one end as a one quarter wave concentric line. The conductor 63 which forms the central conductor of the concentric line is mounted at one end of the cylindrical tank 62 and screw means shown at 69 are provided for axial adjustment to a length equal to one quarter wave length of the applied waves. At the other end of the tank 62, the central conductor 66 of concentric line 65, coupled to junction 24, enters the cavity. The length of the cylinder 62 is on the order of three or four quarter wavelengths, a value which permits relatively tight coupling between the central conductor 66 and the resonant portion of the assembly 31. The degree of coupling is also influenced to some degree by the depth of insertion of central conductor 66. In order to provide ready control of the degree of coupling between the central conductor 66 and the resonant portion of the assembly 31, a laterally movable conductor 67 is mounted on the wall 62 at a point intermediate the innermost portions of the elements 63 and 66. Screw means 98 are shown for allowing the conductor 67 to be inserted to a greater depth into the cavity. Insertion of the member 67 to a depth approaching a quarter wavelength has the effect of almost completely decoupling the tuned circuit from the concentric line 65.

The double tuned circuit 30 is of similar construction to tuned circuit 31. It is formed of a cylindrical conductor 69 closed at both ends by end walls 70 and 71 and having a length approximately twice that of single tuned circuit 31. At end wall 70 a first axially movable conductor 72 is mounted. At end wall 71 a second axially movable conductor 73 is mounted. The members 72 and 73 correspond to the element 63, and form the central conductor of a concentric line resonator at either end of the cylinder 68. Coupling into the double tuned circuit 30 is achieved by transmission line 74, whose central conductor 75 enters the wall of cylinder 68 near the end wall 71. The other end of transmission line 74 is joined to transmission line 65 at 76. A variable coupling is provided at 77 which affects a change in the coupling between the concentric line resonator at the end wall 71 and the concentric line resonator at the end wall 70. Maximum decoupling here occurs when the member 77 is inserted to a depth approximately one quarter wavelength of the applied waves.

A second pair of tuned circuits are shown at 34 and 35 coupled to terminal 25 of the hybrid network. Tuned circuit 35 is similar in construction to the tuned circuit 31 and has variable coupling means shown at 76. Tuned circuit 35 is coupled to terminal 25 through a transmission line 99. Tuned circuit 34 is also provided with variable coupling waves shown at 78. Transmission line 79 is used to couple tuned circuit 34 to transmission line 99, at junction 80, which thus connects both tuned circuits 34 and 35 to terminal 25. Finally the remaining terminals 26 and 27 of hybrid 23 should be coupled respectively to a source 36 and a load 37 through suitable transmission lines 81 and 82 respectively.

The length of the transmission lines 65 and 74 from the junction 76 to the end of the inner conductors 66 and 75 respectively should be adjusted to be ½ wavelength. Likewise, the distances from junction 80 to the end of the inner conductors of transmission lines 99 and 79, entering into tuned circuits 35 and 34, respectively, should also be made equal to ½ wavelength. The lengths of the transmission lines from terminal 24 to junction 76 and from terminal 25 to its junction is not critical, though they are preferably of equal length.

Spacing of each pair of tuned circuits coupled to the same hybrid terminal to a distance equal to one-half wavelength of the mean applied frequencies from the common junction tends to eliminate adverse interaction between the jointly coupled tuned circuits. The members of each pair of tuned circuits coupled to a common terminal are tuned so their attenuation bands are well separated. Consequently, when the applied frequency is going through the resonance point of one tuned circuit, the other tuned circuit is practically an open circuit. Use of a one-half wave line, then has the effect of presenting this open circuit to the junction thereby eliminating interference between the two joined circuits.

In operation, the embodiment shown in Figures 7 and 8 provides the composite attenuation characteristic provided by the arrangement shown in Figures 3 and 5. Double tuned cavity 30, and its associated variable coupling is adjusted in the same manner as the double tuned cavity 6′ and variable coupling 15′. Conjugately connected tuned circuit 34 and its variable coupling shown in Figures 7 and 8 are adjusted similarly to tuned circuit 7 and variable coupling 16 in Figure 5. Tuned circuit 31, and its variable coupling and tuned circuit 35 and its variable coupling of Figures 7 and 8 are likewise adjusted in the same manner as corresponding elements 6, 15, 7 and 16 respectively of Figure 3. Referring to Figures 7 and 8 above, tuned circuit 31 should be tightly coupled, tuned circuit 35 should be relatively loosely coupled, coupling to tuned circuit 30 should be loose as to the resonant element 72, while the coupling is tight to resonant element 73 and tuned circuit 34.

Figure 9:
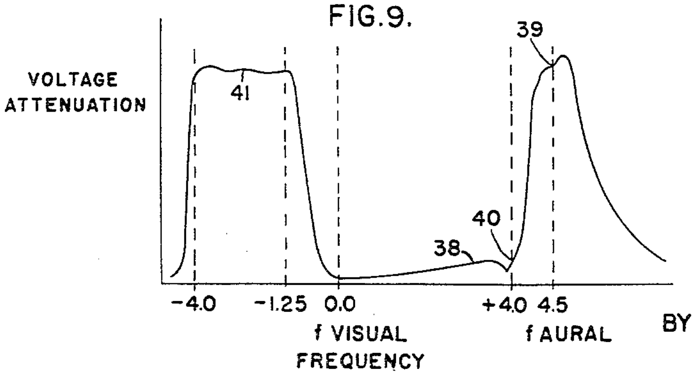
Figure 9 is an explanatory graph illustrative of the voltage attenuation versus frequency for the system shown in Figures 7 and 8.

A graph of the attenuation in voltage versus frequency achieved by the embodiment of Figure 7 is shown in Figure 9. The independence of the sideband filter components and the filter for eleminating interference with the visual transmitter should be noted. The region for passage of the visual signal dips only 1.2 decibels at the lowest point 38. Average rejection about the visual carrier frequency shown at point 39 is approximately 34 decibels. The adequate steepness of the slope over this region is born out of the fact that at point 40 corresponding to 4 megacycles above the visual carrier, the signal 5 is only 1.5 decibels below maximum. The sideband filter portion of the graph generally complies with the required standards, having a value which averages 20 decibels attenuation. These characteristics were achieved by use of a hybrid having concentric lines of three quarter wavelength in length coupled to resonators having a Q of approximately 5,000.

Figure 10:
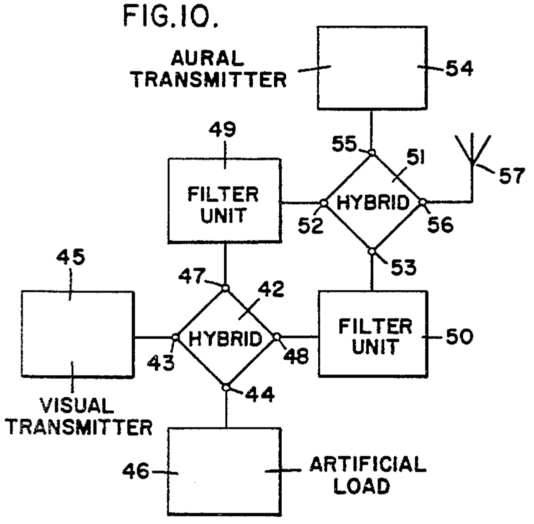
Figure 10 illustrates a television transmission system in which the filter unit of Figure 7 may be employed.

A television transmission system in which the filter units of Figure 7 may be used to advantage is illustrated in Figure 10. A first hybrid network is shown at 42 having conjugately related terminals 43 and 44 coupled respectively to the visual transmitters 45 and the artificial load 46. The other pair of conjugately related terminals 47 and 48 are coupled respectively to the input terminals of two identical filter units 49 and 50. The output terminals of these filter units are then coupled to the hybrid 51 at conjugately related terminals 52 and 53 respectively. The aural transmitter 54 is coupled to terminal 55, of which the conjugate terminal 56 is connected to the antenna 57.

The circuit of Figure 10 eliminates the undesired sideband of the visual transmitter, and provides a single arrangement for providing effective diplexing between the visual and aural transmitters. The output of the visual transmitter is fed into the hybrid 42 where it is split into two components of equal amplitude but differing phase. The two components are then passed to the filter units 49 and 50, which are identical to the units illustrated in detail in Figure 7. After filtering, the waves from the visual transmitter are fed in phased relation to the hybrid 51. When the phased relation is properly maintained, the principal output of the visual transmitter is directed to hybrid terminal 56 and the antenna 57. Any components from the visual transmitter which are reflected by the filter units return to the hybrid and are reflected to the artificial load.

Since the filter units are tuned to attenuate the components of the aural signal, the presence of these units coupled to hybrid 51 not only eliminate passage of aural signals to the visual transmitter, but also facilitate coupling of the aural transmitter 54 to the antenna 57. As may be observed, the aural transmitter 54 is coupled in conjugate with the anntenna 57. The presence of the reflection filters 49 and 50, which are required to be of low shunt impedance at aural signal frequencies, then have substantial reflection coefficients, bringing about a coupling of the aural transmitter to the antenna of fairly high efficiency. The power loss is usually less than half a decibel.

While the description has been primarily directed to preferred arrangements in which the filter serves as a transmission filter coupled in series between the source and the load, the invention may also be applied to a filter arranged for shunt connection.

Figure 11:
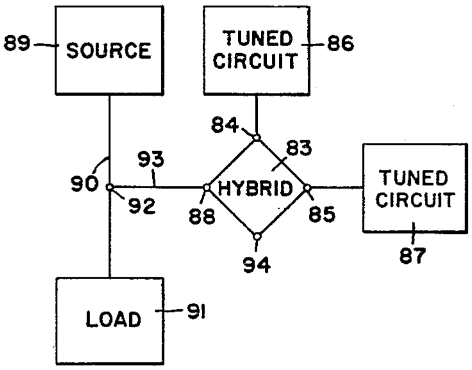
Figure 11 illustrates a hybrid filter arrangement, such as the hybrid filter of Figures 1 or 3, but adapted for a shunt connection to the external transmission network.

Figure 11 illustrates a filter adapted for shunt connection. A hybrid network is shown at 83, having a first pair of conjugately related terminals 84 and 85, coupled respectively to tuned circuits 86 and 87. A third terminal 88 is provided in the hybrid for external connection. A source 89 of electric waves is connected through a transmission line 90 to a load 91. Hybrid network terminal 88 is then connected to transmission line 90 at the junction 92 by a transmission line 93.

The hybrid network 83 may be of the same type previously illustrated, except that no means need be provided for external connection at the junction 94 which is conjugately related to terminal 88. The length of transmission line 93 should be adjusted to be one half wavelength of the transmitted frequencies to provide a characteristic similar to that of Figure 1.

Other arrangements for coupling a pair of differently tuned circuits to the conjugately related terminals of a hybrid will occur to those skilled in the art. Also other kinds of hybrid networks and other kinds of tuned circuits may be employed without departing from the invention. Therefore, by the appended claims, it is intended to cover all such changes and modifications as fall within the true spirit and scope of the invention.

What I claim as new and desire to secure by Letters Patent of the United States is:

1. A filter for high frequency waves comprising a first tuned circuit tuned to a first frequency, a second tuned circuit having two resonant elements tuned respectively to frequencies above and below said first frequency, a hybrid network having two pairs of conjugately related terminals, means for relatively tightly coupling one of one pair of conjugately related terminals to said first tuned circuit, means for relatively tightly coupling the other of said one pair of conjugately related terminals to one resonant element of said second tuned circuit, and means for coupling said second resonant element relatively loosely to the first of said resonant elements so as to increase the rate of change of attenuation with frequency of said filter to frequencies in proximity to the frequency to which said second resonant element is tuned, lying outside the region bounded by the frequencies to which said resonant elements are tuned.

2. A filter for high frequency waves comprising a first tuned circuit tuned to a first frequency, a second tuned circuit tuned to a second frequency, said second frequency being slightly removed from said first frequency, a hybrid network having two pairs of conjugately related terminals, first means for relatively loosely coupling said first tuned circuit to a first terminal of a first pair of said conjugately related terminals and second means for more tightly coupling said second tuned circuit to the second terminal of said first pair of conjugately related terminals, and at least one terminal of the second pair of conjugately related terminals providing for external connection to said filter.

3. A filter for high frequency waves according to claim 2 wherein said second means substantially critically couples said second tuned circuit to said second terminal of said first pair of conjugately related terminals.

4. A filter for high frequency waves comprising a first tuned circuit tuned to a first frequency, a second tuned circuit having two resonant elements tuned respectively to frequencies slightly above and slightly below said first frequency, a hybrid network having first and second pairs of conjugately related terminals, means for relatively loosely coupling a first resonant element of said second tuned circuit to a first terminal of said first pair, means for more tightly coupling the other resonant element of said second tuned circuit to said first terminal, and means for more tightly coupling said first tuned circuit to the second terminal of said first pair, and at least one terminal of said second pair of conjugately related terminals providing for external connection to said filter.

5. A filter for high frequency waves comprising a first tuned circuit tuned to a first frequency, a second tuned circuit tuned to a second frequency slightly removed from said first frequency, a hybrid network having two pairs of conjugately related terminals, first means for relatively loosely coupling a first terminal of a first pair of said conjugately related terminals to said first tuned circuit, and second means for more tightly coupling the second terminal of said first pair of conjugately related terminals to said second tuned circuit so as to increase the rate of change of attenuation with frequency of said filter to frequencies in proximity to said first frequency lying outside the region bounded by said first and second frequencies, and at least one terminal of the second pair of said conjugately related terminals serving for external connection to said filter.

6. A filter for high frequency waves according to claim 5 wherein said second means substantially critically couples said second tuned circuit to said second terminal of said first pair of conjugately related terminals.

7. A filter for high frequency waves comprising a first tuned circuit tuned to a first frequency, a second tuned circuit having two resonant elements tuned respectively to frequencies above and below said first frequency, a hybrid network having first and second pairs of conjugately related terminals, first means for relatively loosely coupling a first terminal of said first pair of conjugately related terminals to a first resonant element of said second tuned circuit, second means for more tightly coupling said first terminal of said first pair of conjugately related terminals to the other resonant element of said second tuned circuit, and third means for more tightly coupling the second terminal of said first pair of conjugately related terminals to said first tuned circuit, said degrees of coupling increasing the rate of change of attenuation with frequency of said filter to frequencies in proximity to the frequency to which said first resonant element is tuned lying outside the region bounded by the frequencies to which said resonant elements are tuned and at least one terminal of said second pair of conjugately related terminals serving for external connection to said filter.

8. A transmission filter for attenuation of the lower sideband and attenuation of a narrow region in the upper frequency portion of the upper sideband of a double sideband modulated carrier comprising a first tuned circuit having two resonant elements tuned respectively to frequencies near the lower and upper limits of the lower sideband, a second tuned circuit tuned to a frequency near the center of said lower sideband, a third tuned circuit tuned to a frequency near the desired upper limit of said upper sideband, a fourth tuned circuit tuned to a frequency slightly removed from the frequency of said third tuned circuit, a hybrid network having two pairs of conjugately related terminals, means for relatively loosely coupling one resonant element of said first tuned circuit to a first terminal of one pair of conjugately related terminals, means for more tightly coupling the other resonant element of said first tuned circuit to said first terminal, means for more tightly coupling said second tuned circuit to said first terminal, means relatively loosely coupling said third tuned circuit to the second terminal of said one pair of conjugately related terminals, and means for more tightly coupling said fourth tuned circuit to said second terminal, and at least one of said other pair of conjugately related terminals serving for external connection to said filter.

9. A high frequency filter comprising four sections of transmission line each of said sections having a length equal to an odd multiple of a quarter wavelength of the waves applied thereto, said sections being connected end to end to form a closed loop, a pair of opposite sections have a characteristic admittance equal to the square root of two times the characteristic admittance of the other pair of opposite sections, first and second tuned circuit means, means for coupling said first tuned circuit means to one end of said other pair of opposite sections, means for coupling said second tuned circuit means to the other end of said last-named section, terminal means coupled at the ends of the section opposite said last-named section serving for external connection to said high frequency filter, said first and second tuned circuit means being tuned to different resonant frequencies, the coupling of said first tuned circuit means to its associated section of transmission line being different than the coupling of said second tuned circuit means to its associated section of transmission line.

References Cited in the file of this patent

UNITED STATES PATENTS

| | | |
|---|---|---|
| 2,301,163 | Koch | Nov. 3, 1942 |
| 2,462,639 | Hubbard | Feb. 22, 1949 |
| 2,531,419 | Fox | Nov. 28, 1950 |
| 2,531,447 | Lewis | Nov. 28, 1950 |
| 2,649,576 | Lewis | Aug. 18, 1953 |
| 2,808,573 | De Bell | Oct. 1, 1957 |